(12) United States Patent
Loprire

(10) Patent No.: US 6,588,646 B2
(45) Date of Patent: Jul. 8, 2003

(54) ULTRASONIC WELDING OF WIRES THROUGH THE INSULATION JACKET THEREOF

(75) Inventor: Nick M. Loprire, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/993,797

(22) Filed: Nov. 24, 2001

(65) Prior Publication Data

US 2003/0098332 A1 May 29, 2003

(51) Int. Cl.⁷ .......................... B23K 20/10; B23K 31/02
(52) U.S. Cl. .................................. 228/110.1; 228/180.5
(58) Field of Search ............................. 228/1.1, 110.1, 228/4.5, 180.5

(56) References Cited

U.S. PATENT DOCUMENTS

| | | | |
|---|---|---|---|
| 3,053,124 A | | 9/1962 | Balamuth et al. |
| 3,717,842 A | * | 2/1973 | Douglas, Jr. ............... 156/73.1 |
| 3,822,465 A | * | 7/1974 | Frankort et al. ............ 156/73.2 |
| 4,039,114 A | * | 8/1977 | Yoshida et al. .............. 228/1.1 |
| 4,730,764 A | * | 3/1988 | Hawkins et al. |
| 4,817,814 A | * | 4/1989 | Coto et al. |
| 4,852,788 A | * | 8/1989 | Patrikios |
| 4,867,370 A | | 9/1989 | Welter et al. |
| 5,031,821 A | * | 7/1991 | Kaneda et al. ............ 228/110.1 |
| 5,423,474 A | * | 6/1995 | Kanagawa et al. ...... 228/110.1 |
| 5,772,100 A | | 6/1998 | Patrikios |
| 5,857,259 A | * | 1/1999 | Johnston ...................... 174/76 |
| 5,957,735 A | | 9/1999 | Shinchi |
| 5,959,253 A | | 9/1999 | Shinchi |
| 6,018,127 A | | 1/2000 | Shinchi et al. |
| 6,027,008 A | * | 2/2000 | Toi et al. ................. 228/110.1 |
| 6,059,617 A | | 5/2000 | Shinchi |
| 6,099,364 A | | 8/2000 | Shinchi |
| 6,099,366 A | | 8/2000 | Shinchi |
| 6,232,556 B1 | * | 5/2001 | Daugherty et al. ....... 174/88 R |
| 6,334,251 B1 | * | 1/2002 | Ide .............................. 174/251 |

FOREIGN PATENT DOCUMENTS

EP          000286031 A2 *  10/1988

OTHER PUBLICATIONS

Ultraweld®40 Fact Sheet of American Technology, Inc of Milford Conn., Date Unknown. But Believed Dated at Least as Early as Nov. 2000.

Ultrasonic Metal Welding for Wire Splicing and Termination by Gary Flood, Published by American Technology, Inc of Milford, Conn. 15 pages, Date Unknown Believed as early as Nov. 2000.

Generic Description of an Insulation Displacement Connection Dated Much Earlier Than Nov. 2000.

* cited by examiner

Primary Examiner—Tom Dunn
Assistant Examiner—Kiley Stoner
(74) Attorney, Agent, or Firm—Thomas N. Twomey

(57) ABSTRACT

A methodology for applying ultrasonic welding processes to insulation jacketed wires without firstly stripping them. A preferred acronym therefor is "UWTI" (Ultrasonic Welding Through Insulation). A wire with its insulation jacket thereon and intact is placed upon a top surface of a base of a terminal to which it is to be bonded and the staking wings of the terminal are staked down onto the wire. The operator places the insulation jacketed wire and terminal combination into a conventional ultrasonic welder, such that the a bottom surface of the base rests upon the anvil and the insulation jacketed wire is aligned with the tip. The operator then causes the sonic welder to automatically sequence so as to provide an ultrasonic weld of the wire to the terminal.

6 Claims, 4 Drawing Sheets

ULTRASONIC WELDING OF WIRES THROUGH THE INSULATION JACKET THEREOF

TECHNICAL FIELD

The present invention relates to ultrasonic welding of electrical wires to terminals. More particularly, the present invention relates to ultrasonic welding of wires to terminals through the insulation jacket of the wires.

BACKGROUND OF THE INVENTION

Ultrasonic welders are known in the art, as exemplified by U.S. Pat. No. 5,772,100, 4,867,370 and 3,053,124. This class of devices utilizes ultrasonic energy to join metals, particularly nonferrous metals used in the electrical arts, as for example the splicing of wires and the attachment of a wire to a terminal. Ultrasonic welding is not actually "welding" in the sense that there is no application of heat as is used in conventional welding, wherein metals are heated to the point of melting into each other. In the case of ultrasonic welding, a mechanical vibration is applied to the metals, typically in the preferred frequencies of 20 kHz or 40 kHz.

The frequency and the amplitude of the vibration cause the metals to mutually gall at their contact surfaces. This galling results in contaminants, such as for example surface oxidation, to be displaced. The galling further causes the contact surfaces to be polished. As galling continues, the contact surfaces become intimate, whereupon atomic and molecular bonding occurs therebetween, thereby bonding the metals together with a weld-like efficacy (ergo, the term "ultrasonic welding").

A number of considerations determine the efficacy of the metal-to-metal surface bond, the major considerations being the amplitude of the vibration, the applied force and the time of application. These variables collectively define the efficacy of bonding between the contacting metal surfaces. The applied power (P) is defined by the amplitude (X) of vibration times the force (F) applied normal to the metal surfaces (P=FX), and the applied energy (E) is defined by the applied power (P) times the time (t) of application (E=Pt). These variables are predetermined to achieve the most efficacious bond based upon the metals and the particular application.

To provide reliable and predictable bonds by ultrasonic welding, ultrasonic welders include power supplies and actuators controlled by a microprocessor. An example thereof is the "ULTRAWELD®/40" ultrasonic welder of AMTECH® (American Technology, Inc.) of Milford, Conn. This class of commercially available ultrasonic welders include: a power supply, a transducer where electrical energy is converted into mechanical vibration, an amplitude booster where the mechanical vibrations are amplified, and an output tool in the form of a horn which tunes the vibrations to a tip. The tip is aligned with a stationary anvil, and the ultrasonic welder includes one or more actuators which allow for movement of the tip relative to the anvil. Preferably, the tip and the anvil are knurled so as to grip the metals placed therebetween.

In operation of a conventional ultrasonic welder, a wire is stripped of its insulation jacket at an end section, and the stripped end section is then placed adjacent a top surface of a base of a terminal to which it is to be bonded. The operator places the stripped section of wire and terminal into the ultrasonic welder, such that the a bottom surface of the base rests upon the anvil and the stripped section of the wire is aligned with the tip. The operator then causes the sonic welder to automatically sequence.

A typical sequence for bonding a wire to a terminal may go as follows: the tip descends onto the stripped section of wire and applies a compressive force between it and the anvil (compressing the stripped section of wire onto the base of the terminal), the location of the tip relative to the anvil is sensed, and if within tolerances, the transducer is actuated so as to apply ultrasonic vibration to the tip for a preset time. Finally, the tip is retracted away from the stripped section of wire. The result is a bond of the stripped section of wire relative to the top surface of the base of the terminal in an area defined generally by the tip area.

A typical sequence for splicing a first wire to a second wire may go as follows: the wires are stripped and then compressed along a horizontal axis, the tip descends onto the stripped section of the wires and applies a compressive force between it and the anvil (compressing the stripped section of the wires along a vertical axis), the location of the tip relative to the anvil is sensed, and if within tolerances, the transducer is actuated so as to apply ultrasonic vibration to the tip for a preset time. Finally, the tip is retracted away from the stripped section of the wires. The result is a bond of the stripped section of the wires relative to each other in an area defined generally by the tip area.

While ultrasonic welding methodologies have advanced considerably in recent years, there remains a universal perception that before ultrasonic welding can occur, the insulation jacket must first be stripped off from the wire. One believed reason for this perception is that while ultrasonic welding is capable of removing surface contaminants, a wire insulation jacket is obviously quite different from mere surface contamination in comparative terms of both the quantity and quality of the material, such that it cannot be regarded simply as a "contaminant" which is capable of being dissipated during application of ultrasonic vibration.

SUMMARY OF THE INVENTION

The present invention is a methodology for applying ultrasonic welding processes to insulation jacketed wires without firstly stripping them. A preferred acronym therefor is "UWTI" (Ultrasonic Welding Through Insulation).

The ultrasonic welding methodology according to the present invention is counter-intuitive, in that it has been discovered that a conventional ultrasonic welding apparatus is capable of providing an ultrasonic bond between a wire and another metal surface through the insulation jacket of the wire.

During the process according to the present invention, the insulation jacket is melted. Accordingly, the insulation jacket must be of a meltable material, as for example a thermoplastic, preferably for example a PVC or a polyester.

According to a method of the present invention, an insulation jacketed wire (multi-stand or single stand) with its insulation jacket thereon and intact is placed upon a top surface of a base of a terminal to which it is to be bonded and the staking wings of the terminal are stacked down onto the insulation jacketed wire. The operator places the insulation jacketed wire and terminal into a conventional ultrasonic welder, such that the a bottom surface of the base rests upon the anvil and the insulation jacketed wire is aligned with the tip. The operator then causes the sonic welder to automatically sequence.

A typical sequence for bonding the insulation jacketed wire to the terminal may go as follows: the tip descends onto the section of wire and applies a compressive force between it and the anvil (compressing both the wire and the insulation jacket onto the base of the terminal), the location of the tip relative to the anvil is sensed, and if within tolerances, the transducer is actuated so as to apply ultrasonic vibration to the tip for a preset time, and finally the tip is retracted away. During application of the ultrasonic vibration, the insulation jacket melts and is entirely displaced and dissipated between the wire and the base of the terminal as the tip presses forceably toward the anvil. The result is a bond of the wire relative to the top surface of the base of the terminal in an area defined generally by the tip area.

Accordingly, it is an object of the present invention to provide an ultrasonic weld of a wire to a secondary metal through the insulation jacket of the wire.

This and additional objects, features and advantages of the present invention will become clearer from the following specification of a preferred embodiment.

DESCRIPTION OF THE PREFERRED EMBODIMENT

Figure 1:
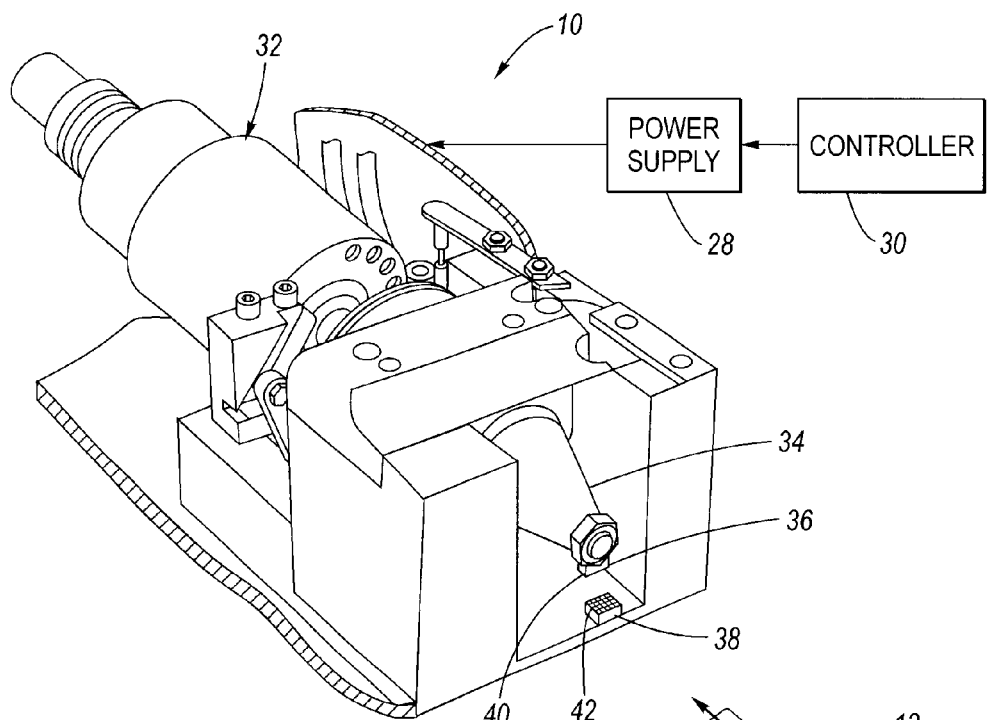
FIG. 1 is a perspective view of an ultrasonic welder with an insulation jacketed wire and terminal combination.
Figure 1:
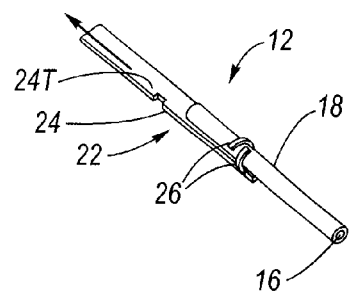

Referring now to the Drawing, FIG. 1 depicts a conventional ultrasonic welder 10 and an insulation jacketed wire and terminal combination 12.

The insulation jacketed wire 14 is composed of a wire 16, which may be single strand or multiple strand (as for example copper), and an insulation jacket 18 which covers the surface of the wire (that is, the surface of the wire parallel to its length). The insulation jacket 18 is of a meltable material, as for example a thermoplastic, preferably for example a PVC or a polyester. The terminal 22 is metallic (as for example a soft metal) and may have any configuration, a male terminal being depicted merely for illustration purposes. The terminal 22 includes a base 24 having opposed; top and bottom surfaces 24T, 24B (see also FIG. 2), and the insulation jacketed wire is placed abutting the top surface. Preferably, but not necessarily, the insulation jacketed wire 14 is staked to the terminal 20 by staking wings 26 of the terminal which preferably do not penetrate the insulation jacket 18 so as not to risk damage or cutting of the multiple-stranded, small-gauged, wire or core 16 (ie., equal to or smaller than 26 gauge).

The ultrasonic welder 10 is generally conventional, as for example (for illustration purposes and not by way of requirement) an "Ultraweld® 40" ultrasonic welder of AMTECH® (American Technology, Inc.) of Milford, Conn. This class of commercially available ultrasonic welders include: a solid state power supply 28 which is user adjusted by controls of a microprocessor based controller 30, a transducer where electrical energy of the power supply is converted into mechanical vibration and an amplitude booster where the mechanical vibrations of the transducer are amplified 32, an output tool in the form of a horn 34 which tunes the vibrations to a tip 36. The tip 36 is aligned with a stationary anvil 38, and the ultrasonic welder further includes one or more actuators which allow for movement of the tip relative to the anvil 38. Preferably, the tip 36 and the anvil 38 have mutually facing work surfaces 40, 42 which are knurled so as to grip objects placed therebetween as the tip is forced toward the anvil. The frequency may be fixed at 20 kHz, at 40 kHz or at another frequency, or the frequency may be other than fixed.

Figure 1A:
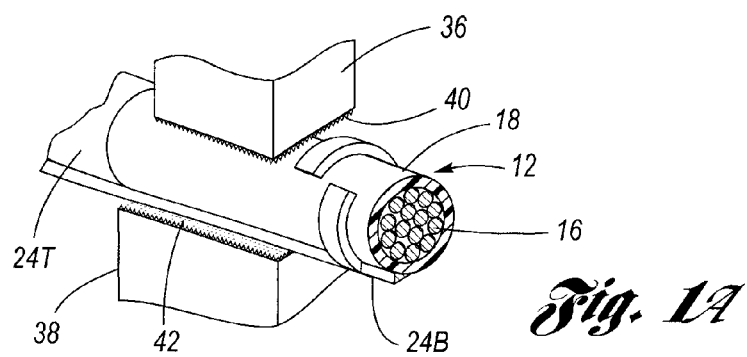
FIG. 1A is a perspective view of an ultrasonic welder as in FIG. 1, wherein an insulation jacketed wire and terminal combination as in FIG. 1 is seated with respect to the ultrasonic welder, wherein the tip of the ultrasonic welder is at its retracted position.
Figure 2:
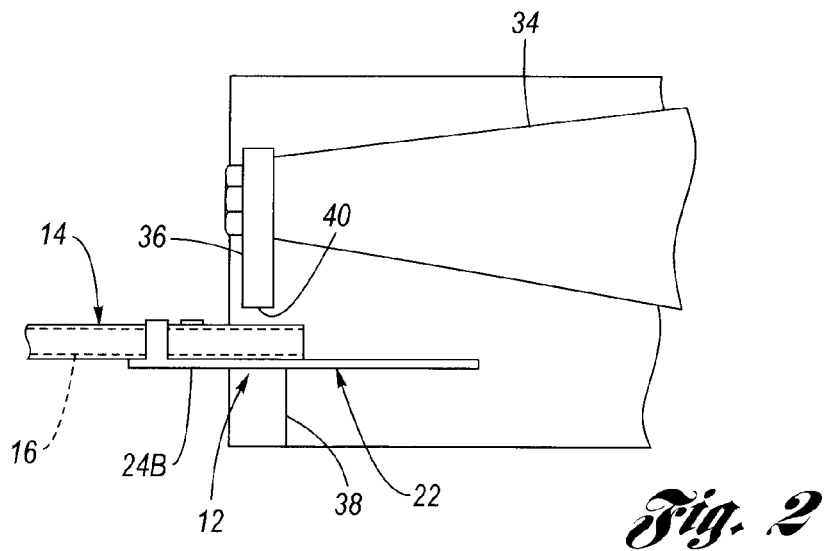
FIG. 2 is a side view of the ultrasonic welder and insulation jacketed wire and terminal combination as in FIG. 1A.
Figure 2A:
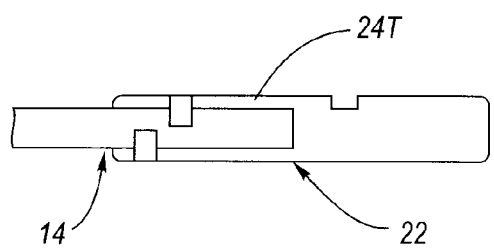
FIG. 2A is a top plan view of the insulation jacketed wire and terminal combination of FIG. 2.

As comparatively depicted by FIGS. 1, 1A and 2, the base 24 of the terminal 22 is oriented so that the bottom surface 24B rests upon the anvil 38 and the insulation jacketed wire 14 faces the tip 36. This step is shown completed at FIG. 2, wherein FIG. 2A depicts a top plan view of the jacketed wire and terminal combination 12, as seen from the work surface 40 of the tip 36.

The operator now actuates operation of the ultrasonic welder 10. In this regard, prior trial runs should be made to determine optimum parameters for efficacious bonding of the wire 16 to the terminal 22, and these optimum parameters should have been entered via the microprocessor based controller 30 (as for example optimum amplitude, force and time (the frequency being a usually, but not necessarily, set feature of the ultrasonic welder).

Figure 3:
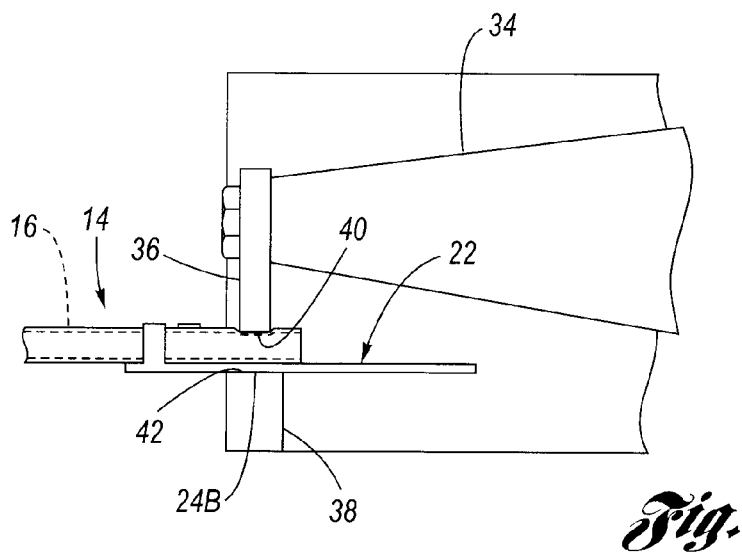
FIG. 3 is a side view of the ultrasonic welder and insulation jacketed wire and terminal combination of FIG. 2, wherein the tip of the ultrasonic welder is at a first operative position.
Figure 3A:
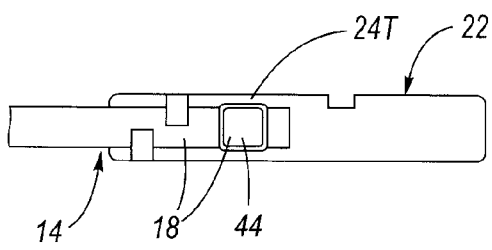
FIG. 3A is a top plan view of the insulation jacketed wire and terminal combination of FIG. 3.

An intermediate operational stage is depicted at FIG. 3, wherein the work surface 40 of the tip 36 has been moved into forceful abutment with the insulation jacketed wire 14, wherein the insulation jacketed wire is sandwiched against the top surface 24T of the base 24 of the terminal 22 in that the bottom surface 24B of the base is now in forceful abutment with the work surface 42 of the anvil 38. As shown at FIG. 3A, the insulation jacket 18 is dimpled 44 by the work surface 40 of the tip 36, but not broken (although it could be). At this stage of operation, the microprocessor based controller 30 determines whether surfaces are located within in predetermined allowances. If not, an error is called out, otherwise the microprocessor programming advances to the next and final step.

Figure 4:
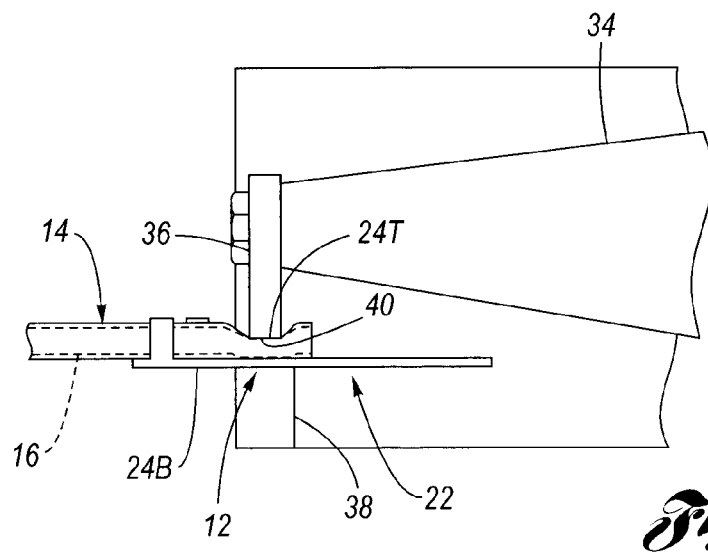
FIG. 4 is a side view of the ultrasonic welder and insulation jacketed wire and terminal combination of FIG. 2, wherein the tip of the ultrasonic welder is at its final operative position.

As shown at FIG. 4, the solid state power supply 28 now activates the transducer/booster 32, whereupon mechanical vibration arrives via the horn 34 to the tip 36. The insulation jacket 18 is believed to now vibrate with the work surface 40 of the tip 36 relative to the wire 16. And, while this view may present to a skilled artisan a reason to argue that ultrasonic welding of the wire to the terminal 22 will not happen, Applicant has discovered that ultrasonic welding does, in fact, happen. Visibly, the insulation jacket melts and flowably displaces both at the work surface 40 of the tip 36 and at the top surface 24T of the base 24 as the tip vibrates and continues being forced toward the anvil 38. It is believed that after this flowing displacement, any remaining insulation jacket material is then dissipated from between the contact surfaces of the wire 16 and the base 24 in the manner of conventional dissipation of contaminants by ultrasonic welding.

Figure 4A:
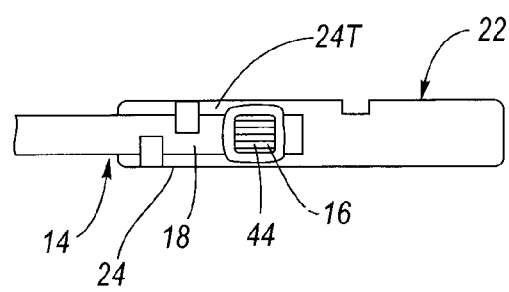
FIG. 4A is a top plan view of the insulation jacketed wire and terminal combination of FIG. 4.
Figure 4B:
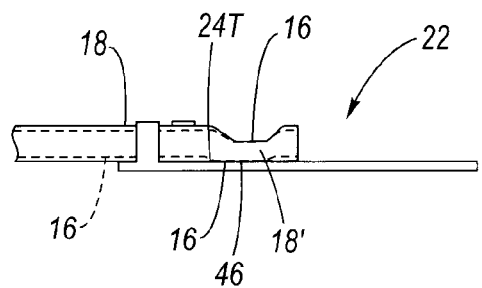
FIG. 4B is a side view of the insulation jacketed wire and terminal combination of FIG. 4.

As shown at FIGS. 4A and 4B, upon conclusion of the application of ultrasonic vibration, the insulation jacket 18 has formed a displacement mass 18' around on diametrically opposing sides where the tip 36 was located, so that now the wire 16 is exposed at one side and bonded by an ultrasonic weld 46 to the top side 24T of the base 24.

Figure 5:
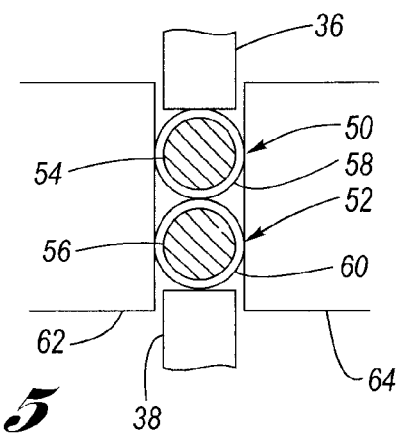
FIG. 5 is a partly sectional view of an ultrasonic welder being utilized to ultrasonically weld (splice) wires through the insulation jackets thereof.
Figure 5A:
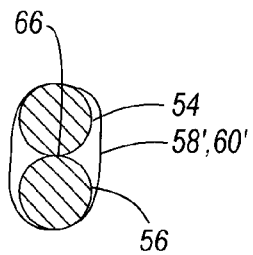
FIG. 5A is a sectional view of the wires of FIG. 5 after being ultrasonically welded through their insulation jackets.
Figure 6:
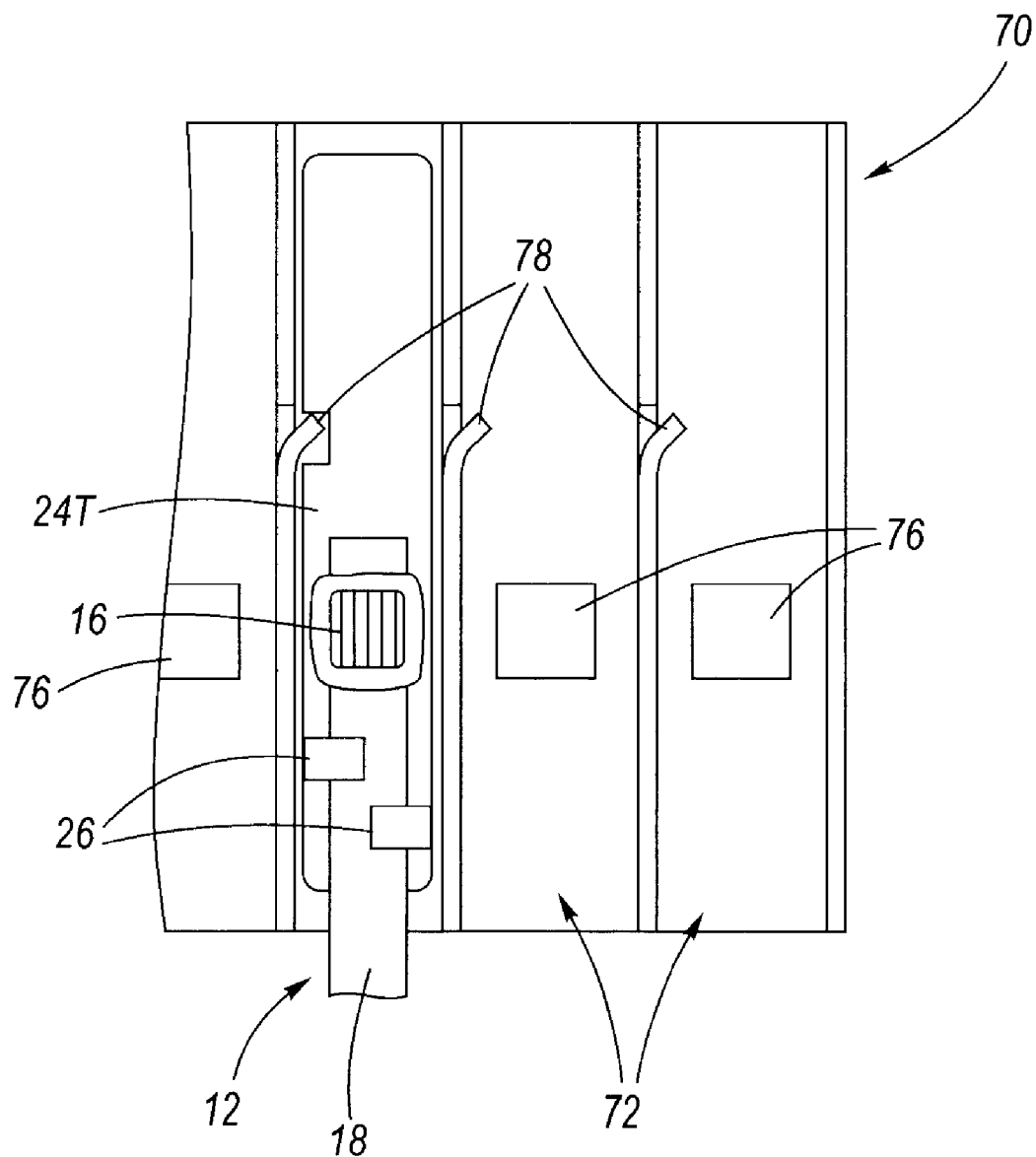
FIG. 6 is a top plan view of a jig for sequentially placing a plurality of jacketed wire and terminal combinations into an ultrasonic welder.

FIG. 5 depicts an alternative mode of carrying out the present invention, wherein two insulation jacketed wires 50, 52, each having a single strand wire 54, 56, are spliced together by ultrasonic welding through the insulation jackets 58, 60. The wires are compressed horizontally by gathering members 62, 64, compressed vertically by an opposed tip and anvil 36, 38 and then subjected to ultrasonic vibration by the tip, as described hereinabove. The result is shown at FIG. 5A, wherein the insulation jackets 58, 60 are now jumbled into a displacement mass 58', 60' and the wires 54, 56 are bonded at an ultrasonic weld 66.

For purposes of automation, it is preferred to place a plurality of the insulation jacketed wires and terminal combinations 12 onto a jig 70. The jig has a seat 72 respectively for each insulation jacketed wire and terminal combination 12. A floor 74 of the jig has apertures 76 for sequentially receiving therethrough the aforesaid anvil 38. Each seat 72 has a resilient boss 78 for holding seated thereat its respective insulation jacketed wire and terminal combination 12.

Operatively, several considerations relative to the present invention discovery should be kept in mind. Firstly, there must be provided some place for the insulation jacket displacement mass to go. While this is not a concern for ultrasonically bonding an insulation jacketed wire to a terminal, this can be an impeding problem for splicing of multi-stranded wires. Secondly, the type of insulation jacket is critical: the insulation jacket must be of a composition which melts when heated so that it will flowably displace. Suitable insulation jacket materials include thermoplastics. Lastly, the thinner the insulation jacket the better, particularly in terms of accommodating insulation jacket dissipation mass.

Examples of the method according to the present invention will now be detailed. Three insulation jacketed wires were tested as indicated by Table 1. Insulation jacketed wires having I.D. numbers 1 and 2 are a seven strand copper wire with an ultra thin wall PVC insulation jacket 0.25 mm thick. Insulation jacketed wire having 1.D. number 3 is composed a solid core copper wire with an ultra thin wall PVC insulation jacket 0.25 mm thick. In each case the terminal was of a copper alloy. The ultrasonic welder was an "Ultraweld® 40" ultrasonic welder of AMTECH® (American Technology, Inc.) of Milford, Conn. operating at 40 kHz, having anvil and tip cross-sections of 2.1 mm by 2.1 mm. In each example an excellent ultrasonic bond was achieved between the wire and the terminal, in terms both of strength and electrical conductivity.

TABLE I

| I.D. No. | Wire Size (mm²) | Energy (Joules) | 1st Contact Pressure (psi) | Weld Contact Pressure (psi) | Amplitude (microns) | Thickness Before Weld (mm) | Thickness After Weld (mm) |
| --- | --- | --- | --- | --- | --- | --- | --- |
| 1 | 0.35 (22 gauge) | 31 | 23 | 28 | 25 | 1.66 | 0.73 |
| 2 | 0.5 (20 gauge) | 34 | 30 | 33 | 27 | 1.80 | 1.00 |
| 3 | 0.14 (26 gauge) | 13 | 18 | 21 | 20 | 1.42 | 0.81 |

The methodology according to the present invention has great utility for the handling of small (ie., 26 gauge) wires. Small gauge wires are frequently very difficult to strip without injuring the wire or multi-stranded core 16. For instance, small gauged insulated wires 14 of less than 26 gauge are known to have cores 16 containing less than seven strands of copper along with very thin insulation jackets (ie., less than 0.25 mm) which are particularly difficult to strip without cutting at least one of the strands. Because each strand of the core 16 may be necessary to carry required circuit currents, when stripping is conducted, wires 14 have typically been sized larger than required expecting some core damage. Consequently, ultrasonic welding of small gauge wires is costly and difficult. However, the method according to the present invention does not require pre-stripping of wires, so that now small wires can, for the first time, be economically attached to terminals.

It is to be understood that any number of insulation jacketed wires may be simultaneously sonicly welded through the insulation thereof. For example, a large number of small (ie., 26 gauge) wires may be simultaneously sonically welded to the base of a terminal using the herein methodology.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for ultrasonic welding comprising the steps of:

seating into a jig a terminal;

locating at least one insulation jacketed wire adjacent the terminal, wherein the insulation jacket spaces the wire from the terminal, and further wherein said step of locating comprises staking the at least one insulation jacketed wire to the terminal;

placing the jig, the at least one insulation jacketed wire and the terminal into an ultrasonic welder, wherein said step of placing comprises placing the at least one insulation jacketed wire facing a tip of the ultrasonic welder and placing the terminal facing an anvil of the ultrasonic welder;

passing the anvil through an aperture in the jig so that the anvil contacts the terminal; and actuating the ultrasonic welder to thereby cause the insulation jacket to be displaced and for the wire to be ultrasonically welded to the terminal.

2. A method for ultrasonic welding an insulation jacketed wire to a secondary metal seated in a jig having an aperture, the insulation jacketed wire having an insulation jacket which spaces the wire from the secondary metal and has a thickness equal to or less than 0.25 mm, the method comprising the steps of:

placing the jig, the insulation jacketed wire and the secondary metal into an ultrasonic welder, wherein the insulation jacketed wire faces a tip of the ultrasonic welder and the secondary metal faces an anvil of the ultrasonic welder;

passing the anvil through the aperture in the jig so that the anvil contacts the secondary metal; and actuating the ultrasonic welder to thereby cause the insulation jacket to be displaced and for the wire to be ultrasonically welded to the secondary metal.

3. A method of ultrasonic welding comprising the steps of:

placing an electrical insulation jacket of a wire directly upon a first surface of a non-ferrous terminal in electrically insulating contact, wherein the electrical insulation jacket directly spaces a non-ferrous core of the wire from the non-ferrous terminal;

inserting the terminal and the wire between an anvil and a tip of an ultrasonic welder;

placing the anvil directly against a second surface of the non-ferrous terminal, wherein the first surface faces opposite the second surface;

placing the tip directly against the insulation jacket, wherein the tip is insulated electrically from the terminal by the insulation jacket;

vibrating the tip;

moving the vibrating tip toward the anvil to displace the insulation jacket from the non-ferrous core;

making direct electrical contact of the non-ferrous core with the first surface of the terminal and direct contact of the non-ferrous core with the vibrating tip;

producing an ultrasonic weld between the terminal and the non-ferrous core of the wire; and retracting the tip before the tip ever makes direct contact with the terminal.

4. The method of ultrasonic welding of claim 3 comprising after the step of placing the electrical insulation jacket and before the step of inserting the terminal, mechanically crimping the terminal to the insulation jacket of the wire in non-electrical contact.

5. The method of ultrasonic welding of claim 3 comprising before the step of placing the insulation jacket inserting the terminal into a jig.

6. The method of ultrasonic welding of claim 5 comprising after the step of placing the insulation jacket and before the step of placing the anvil, inserting the anvil transversely through the jig.

* * * * *